Feb. 11, 1930.  G. HAYN  1,746,350
CONTROL DEVICE FOR FUEL FEEDING MECHANISM
Filed Aug. 20, 1928
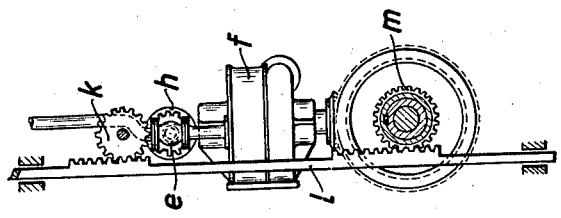
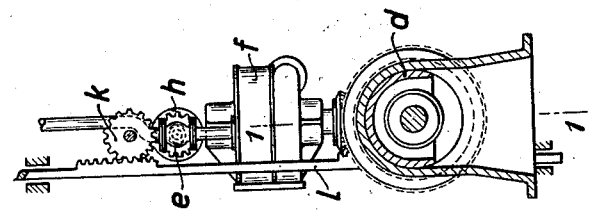
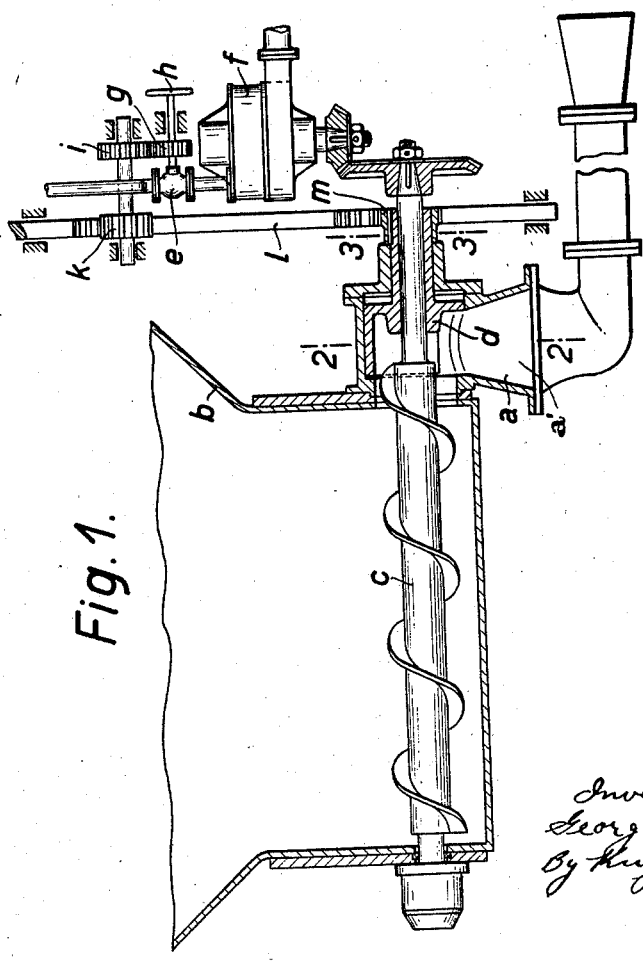

Patented Feb. 11, 1930

1,746,350

UNITED STATES PATENT OFFICE

GEORG HAYN, OF CASSEL, GERMANY

CONTROL DEVICE FOR FUEL-FEEDING MECHANISM

Application filed August 20, 1928, Serial No. 300,881, and in Germany September 15, 1927.

The invention relates to control devices for fuel feeding mechanism, especially for coal dust furnaces and similar devices.

In coal dust and similar furnaces a screw conveyer is normally inserted between the coal dust bunker and the piping that supplies the coal dust to the burner, to convey the coal dust from the bunker into the piping and to permit a regulation of the delivered coal dust quantity by varying the rate of revolutions of the screw conveyer. Now, when the coal dust bunker is not tightly closed toward the piping leading to the burner, while the latter is out of operation, the danger exists of coal dust dribbling into the piping and provoking an ignition therein, upon the flame happening to strike back. Hitherto this dribbling of the coal dust has been prevented by providing the screw conveyer with several additional coils extending into a tubular piece directly attached to the bunker, so that coal dust is delivered into the piping only at the end of this tubular piece and the portion of the screw conveyer located in the latter, acts as a sort of labyrinth and shuts off the bunker from the piping. This arrangement however suffers from the drawback of having a great structural length, especially in the case of locomotives, where only little space is at disposal.

The invention has therefore for its object to overcome this drawback, which object is obtained by a shutting-off member being provided on the outlet opening for the coal dust at the end of the screw conveyer arranged in the coal dust bunker, so that the above-mentioned tubular piece and the extension of the conveyer are rendered superflous. This shutting-off member may be designed e. g. as a cylindrical rotary slide, whereby a particularly narrow and compact construction is obtained. Furthermore, the shutting-off member preferably is positively coupled with the starting means of the drive of the screw conveyer in such a manner, that the shutting-off member is open only when the screw conveyer is in operation, but is closed upon the latter being inoperative, so that on the one hand, when the burner is at rest, any dribbling of coal dust and therewith an ignition in the piping is prevented upon the flame happening to strike back, and on the other hand the coal dust cannot be supplied by the conveyer when the shut-off member is in closing position.

In order to permit my invention to be more easily understood, a preferred embodiment of same is illustrated by way of example in the drawing which accompanies and forms part of this specification. In this drawing Figure 1 is a longitudinal vertical section through the entire arrangement on line 1—1 of Fig. 2, Figure 2 is a section on line 2—2 of Figure 1, seen from the left, and Figure 3 is a section on line 3—3 of Figure 1, likewise seen from the left.

The bottom aperture $a'$ provided in housing $a$ attached to coal dust bunker $b$ at the delivery end of the screw conveyer $c$ can be closed by a cylindrical rotary slide $d$. This slide is positively coupled with the throttling valve $e$ of the driving engine $f$, of the screw conveyer $c$ which is, for instance, a steam turbine, in such a manner that the slide $d$ is in opening position only when the conveyer $c$ is in operation, but in closing position when the latter is at rest. This is obtained by a spur wheel $g$ mounted on the stem $h$ of the valve $e$ shifting a rack $l$ by means of two pinions $i$ and $k$, which rack in its turn is in mesh with a pinion $m$ rigidly connected to the rotary slide $d$.

What I claim and desire to secure by Letters Patent, is:—

1. In a coal dust furnace a burner, a coal dust bunker and a screw conveyer arranged in connection therewith and adapted to feed coal dust to the burner, a driving engine for said conveyer, a starting valve for said engine, a rotary slide disposed at the delivery end of said screw conveyer and adapted to shut-off the latter toward the burner, and a gear train arranged between the stem of said valve and said slide, providing for simultaneous closing of said valve and said slide.

2. In a coal dust furnace a burner, a coal dust bunker and a screw conveyer arranged in connection therewith and adapted to feed coal dust to the burner, a driving engine for said conveyer, a starting valve for said engine, a rotary slide disposed at the delivery end of said screw conveyer, and adapted to shut-off the latter toward the burner, a pinion fast on the stem of said starting valve, a shaft with two pinions fast thereon one of which is in mesh with said first-named pinion, a rack in mesh with the other of said two pinions, and a fourth pinion fast on said slide and in mesh with said rack.

In testimony whereof the foregoing specification signed at Frankfort-on-the-Main, Germany, this 2d day of August, 1928.

GEORG HAYN.